(12) United States Patent
Schmid

(10) Patent No.: US 10,967,622 B2
(45) Date of Patent: Apr. 6, 2021

(54) COATING DEVICE AND COATING METHOD

(71) Applicant: HOMAG GmbH, Schopfloch (DE)

(72) Inventor: Johannes Schmid, Starzach-Wachendorf (DE)

(73) Assignee: HOMAG GmbH, Schopfloch (DE)

( * ) Notice: Subject to any disclaimer, the term of this patent is extended or adjusted under 35 U.S.C. 154(b) by 98 days.

(21) Appl. No.: 16/147,542

(22) Filed: Sep. 28, 2018

(65) Prior Publication Data

US 2019/0099992 A1 Apr. 4, 2019

(30) Foreign Application Priority Data

Sep. 29, 2017 (DE) .......................... 102017122701.6

(51) Int. Cl.
| | |
|---|---|
| *B32B 41/00* | (2006.01) |
| *B32B 37/12* | (2006.01) |
| *B32B 7/12* | (2006.01) |
| *B27D 5/00* | (2006.01) |

(52) U.S. Cl.
CPC .............. *B32B 37/12* (2013.01); *B27D 5/003* (2013.01); *B32B 7/12* (2013.01); *B32B 41/00* (2013.01)

(58) Field of Classification Search
CPC ........... B32B 37/12; B32B 7/12; B32B 41/00; B27D 5/003; B27G 11/00
USPC ..................... 156/60, 64, 350, 351, 378, 379
See application file for complete search history.

(56) References Cited

U.S. PATENT DOCUMENTS

| | | |
|---|---|---|
| 2017/0106581 A1 | 4/2017 | Schmid et al. |
| 2019/0176425 A1* | 6/2019 | Droge ....................... B30B 5/06 |

FOREIGN PATENT DOCUMENTS

| | | | |
|---|---|---|---|
| DE | 202009006794 U1 | 10/2009 | |
| DE | 202009019008 | 5/2015 | |
| DE | 102016204249 | 9/2017 | |
| EP | 0733450 A1 * | 9/1996 | ............... B27D 5/00 |
| EP | 2243619 | 10/2010 | |
| EP | 2251171 | 11/2010 | |
| EP | 2428340 A1 | 3/2012 | |
| EP | 2433745 | 3/2012 | |

\* cited by examiner

*Primary Examiner* — Michael N Orlando
*Assistant Examiner* — Joshel Rivera
(74) *Attorney, Agent, or Firm* — Morgan, Lewis & Bockius LLP

(57) ABSTRACT

The present invention relates to a coating device which, in particular, is used to coat a narrow side of a plate-shaped workpiece with a coating material. Furthermore, the present invention relates to a coating method which, in particular, is used to coat a narrow side of a plate-shaped workpiece with a coating material. The coating device comprises a detection device (S1, S2) for detecting a surface property on the surface of the workpiece (W) to be coated and a device for acting on the adhesive to be used based on the detection result of the detection device.

19 Claims, 2 Drawing Sheets

COATING DEVICE AND COATING METHOD

TECHNICAL FIELD

The present invention relates to a coating device which is used, in particular, for coating a narrow side of a plate-shaped workpiece with a coating material. Furthermore, the present invention relates to a coating method which, in particular, is used for coating a narrow side of a plate-shaped workpiece with a coating material. Such a coating device and such a coating method are used, in particular, in the area of the furniture and components industry.

BACKGROUND

When coating plate-shaped workpieces on their narrow side, it is known in the prior art to use a pre-coated coating material, the adhesive layer thereof is activated shortly before the application of the coating material onto the narrow side of the workpiece. Co-extruded coating materials are also known in this context.

According to a further possibility, a coating material can be provided with an adhesive before the application of the coating material onto the narrow side of the workpiece.

Moreover, devices are also known in which the adhesive is applied to the narrow side of the workpiece and a coating material is subsequently applied to this narrow side wetted with the adhesive.

For example, an adhesive feeding device for applying an adhesive to a workpiece is known from EP 2 428 340 A1. This adhesive feeding device comprises a base as well as a movable upper part having edges for focusing the adhesive arranged above the base. Moreover, an adhesive transfer tool attached to the base is provided, in particular, a glue roller, with the adhesive feeding device feeding the adhesive from the upper part to the adhesive transfer tool during operation. In order to dose the amount of the adhesive, the adhesive feeding device comprises an adjusting mechanism for adjusting the position of the upper part relative to the adhesive transfer tool.

Further, a device for coating workpieces is known from EP 2 251 171 A1 which has a feeding device for feeding a coating material to a surface of a workpiece to be coated, a pressing device for pressing the coating material onto the surface of the workpiece to be coated and a conveyor device for effecting a relative movement between the workpiece and at least the pressing device.

Moreover, DE 20 2009 006 794 U1 is known which relates to a gluing aggregate.

Despite the different devices already known in the prior art with which an adhesive (adhesive substance) can be applied to a narrow side of a plate-shaped workpiece or a pre-coated coating material is used, it is evident that an improved method technique is required in order to provide the adhesive in an optimal manner.

For example, an adhesive layer that is too thick can lead to it smearing when the coating material is applied, or a joint layer that is too thick is formed and which is therefore unacceptable for aesthetic reasons.

SUBJECT MATTER OF THE INVENTION

An object of the present invention is to provide a coating device and a coating method which takes into account the increased requirements for an optical appearance and a high value of the connection between coating material and workpiece.

In this regard, a coating device according to claim 1 as well as a coating method according to claim 12 is provided. Further preferred embodiments are stated in the dependent claims, with features of the method claims being able to be combined with the device claims and vice-versa. Further preferred embodiments are described below.

The coating device which, in particular, is suited to coating a narrow side of a plate-shaped workpiece comprises: a pressing element for applying a coating material to a surface of a workpiece to be coated, with it being preferred that the pressing element is suited to applying a coating material for a narrow side, and an apparatus for effecting a relative movement between the workpiece and the pressing element. Furthermore, the coating device comprises a detection device for detecting a surface property on the surface of the workpiece to be coated and a device for acting on the adhesive to be used. A surface property can be a surface temperature and/or a surface roughness of a surface to be coated.

The "device for acting on the adhesive to be used" is, for example, configured to raise the temperature of the adhesive and/or to influence or to change, for example to increase and to reduce, the amount of the adhesive to be provided on the workpiece and/or on the coating material.

"Act on" thereby particularly means a heating or cooling of the adhesive, an influencing/changing of a (material) property of the adhesive, influencing/changing a provided adhesive amount, influencing/changing a type of the provision of the adhesive (for example, dot-shaped, strip-shaped, etc), adding a further component to the adhesive, or a width of the adhesive provided on the surface of the workpiece and the coating material.

An adhesive which is to be applied to the workpiece or to a coating material (for example, by means of a nozzle, a spraying device, a roller or the like) can thereby be acted on or an adhesive already provided on the coating material can be acted on.

The present invention has the advantage that the joining process is monitored and optionally controlled such that the adhesive layer is made available in an optimized manner, in particular in an optimal amount and/or with an optimal heat management, through which an improved connection between coating material and workpiece can be ensured in turn. This results in a rapid operation which is preferably suited to a wide variety of production (1-piece production).

Workpieces to be coated within the scope of the invention are preferably plate-shaped workpieces which, in particular, are to be provided with a coating material (a so-called edge strip) on the narrow side.

The workpiece to be coated is, for example, a chipboard, an MDF board, an HDF board, a lightweight board, a board from composite material, a solid wood board, or the like. Purely by way of example, a coated workpiece can be a kitchen countertop, a furniture front, a shelf for a cupboard or a shelving rack, or the like.

It is preferred that the coating device comprises a control device which is configured to receive the detection result of the detection device and to actuate a device for changing a property of the adhesive. In this manner, framework conditions of a batch of workpieces, or also framework conditions of an individual workpiece can be reacted to so that the adhesive is optimally configured for the application of a coating material.

It is preferred that the detection device is arranged such that the detection device detects the surface property directly before the application of the adhesive or the application of the coating material provided with the adhesive. In this manner, a high precision can be ensured when adjusting the optimal adhesion properties.

In one embodiment, the coating device comprises an applicator element for applying an adhesive to the surface of the workpiece to be coated, with the coating device being configured to change the adhesive temperature at or in the area of the applicator element on the basis of the detection result of detection device. In particular, the applicator element can comprise a heating element.

The applicator element can be formed, for example, as an applicator roller, as a spraying device or as an application nozzle.

In the case of an applicator roller, it is provided, for example, with a heating element (for example, a heating cartridge). In the case of the spraying device or the application nozzle, a heating element or a heat radiator is arranged in the area of the spray or nozzle opening in order to influence/to change the temperature of the adhesive directly before the application onto the surface to be coated.

According to a further embodiment, it is provided that the coating device comprises a dosing device for changing the adhesive amount to be applied by the applicator element to the workpiece, with the dosing device being configured to change the adhesive on the basis of the detection result of the detection device. For example, a certain material of a workpiece can require a higher or lower amount of adhesive, and consequently affects the adhesive to be used.

In particular, it is provided that the detection device comprises a sensor for detecting the surface roughness. Consequently it can be detected whether, for example, in the case of a relatively rough workpiece surface, a larger amount of adhesive is needed or, in the case of a relatively smooth, non-porous surface a smaller amount of adhesive is required.

It is preferred that the detection device comprises a sensor for detecting the surface temperature, the sensor being formed in particular as an IR temperature sensor. Consequently, it is possible to detect whether the workpiece has a "suitable" surface temperature.

If the surface temperature of the workpiece is, for example, relatively low, it can be necessary to raise the temperature of the adhesive in order to prevent a hardening of the adhesive or sections of the adhesive which is too fast. A lower surface temperature of the workpiece can occur if a relatively cold workpiece is supposed to be immediately coated without prior machining.

In the case of a higher surface temperature, it may be advisable to reduce the temperature of the adhesive to avoid that the time required to harden the adhesive takes too long. A raised surface temperature can result from a certain, rather heat-producing machining is carried out before the adhesive or the coating material provided with the adhesive is applied to this machined surface or arranged on it. In this case, it could be that the applied coating material "floats" on the partially liquid adhesive, which tends to harden over a longer period of time, and is possibly shifted before complete hardening (especially if a machining, as with a drawing chip tool, is carried out immediately after application of the coating material).

It is preferred that the apparatus for effecting a relative movement between the workpiece and the pressing element and/or the applicator element is a belt conveyor, a chain conveyor, or a band conveyor. Consequently, the coating device is formed as a pass-through machine.

However, according to an alternative configuration, it can also be provided that the workpiece is at least at times kept stationary whilst the pressing element is moved to apply a coating material along the workpiece.

According to a further embodiment it is provided that a testing device is provided for testing the adhesive applied by the applicator element, with the testing device preferably being a temperature sensor, in particular an IR temperature sensor. The testing device is provided in a traveling direction D particularly before the pressing element and further preferably after the applicator element for applying the adhesive to the surface to be coated. Preferably, the testing device is connected to the control device. According to a further embodiment, the testing device is configured to detect the thickness of the adhesive layer.

According to one embodiment, the coating device comprises an activation device which is configured to activate the adhesive of the coating material provided with the adhesive based on the detection result of the detection device. If, for example, an increased temperature on the surface to be coated is ascertained as a surface property, the activation energy to be applied to the adhesive by the activation device can thus be reduced in order to achieve an optimal adhesion.

The activation device can be a laser, a hot-air source, infrared source, ultrasound source, magnetic field source, microwave source, plasma source and/or gassing source.

According to a further embodiment, the coating device comprises a manipulation device for manipulating the surface to be coated. The manipulation device is provided (in the traveling direction) in particular after the detection device and before the pressing element, preferably provided between the detection device and the applicator element for applying the adhesive.

The manipulation device can be, for example, a heating device for raising the surface temperature at the surface to be coated.

Preferably, the manipulation device is connected to the control device.

Furthermore, the present invention relates to a method having the features of claim 12. It is thereby preferred within the scope of the method that the coating device is used in accordance with one of the previous aspects.

It is preferred that the adhesive is applied to the surface of the workpiece to be coated prior to the application of the coating material or the coating material is pre-coated with the coating material.

According to one embodiment it is provided that the surface property is a surface roughness, with it being preferred that, on the basis of the detection result of the surface roughness, the amount of the adhesive is changed. Additionally or alternatively, the temperature of the adhesive can be changed.

The temperature of the adhesive can thereby be changed in the applicator element as well as by changing the energy input into the adhesive on the coating material. The acting upon the adhesive provided on the coating material can, for example, occur by means of a laser, a hot-air source, infrared source, ultrasound source, magnetic field source, microwave source, plasma source and/or gassing source.

It is preferred that the surface property is a surface temperature, with it being preferred that, on the basis of the detection result of the surface temperature, the temperature of the adhesive is changed and/or the surface to be coated is acted on by a temperature regulating device.

According to an especially preferred variant, the surface roughness and the surface temperature are detected and the amount of adhesive and/or the temperature of the adhesive is changed.

DETAILED DESCRIPTION OF THE PREFERRED EMBODIMENT

Preferred embodiments of the present invention are described below on the basis of the enclosed drawing. Further modifications of certain individual features mentioned in this context can each be combined with one another in order to form further embodiments.

Although the invention is described using the schematic drawings which each depict a course of the procedure, components of a coating device according to the invention are also revealed by the drawings.

Figure 1:
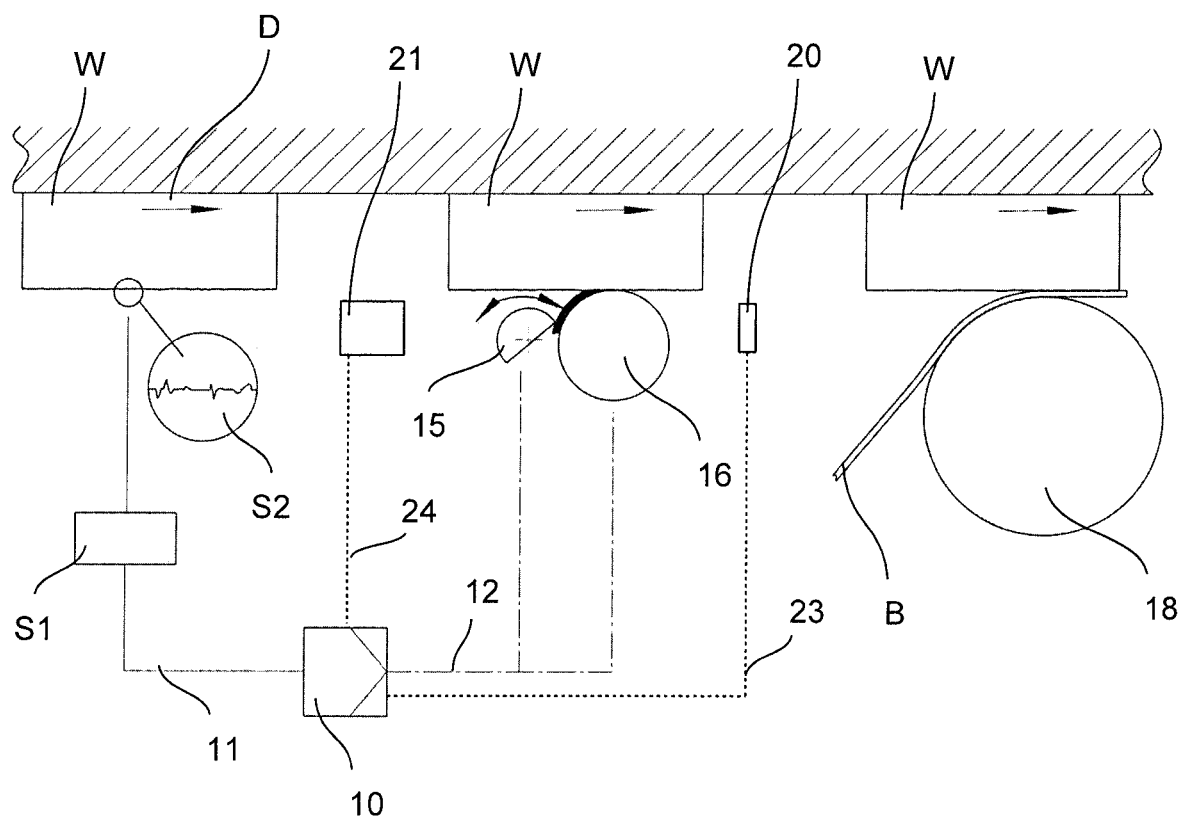
FIG. 1 schematically shows a course of the procedure with a coating method according to a first embodiment of the description.

The coating method described using FIG. 1 is a so-called continuous process in which a workpiece W is moved, whereas the coating aggregate which comprises inter alia an applicator element (glue roller) and a pressure roller, essentially remains stationary. It is apparent that according to a further embodiment, the coating aggregate can be moved whilst the workpiece is at least at times kept stationary.

The workpiece W is continuously moved in the traveling direction D, for example, by means of a belt conveyor. Before the workpiece W reaches the section of the glue application, the surface temperature is determined by a first sensor S1 in an area in which the adhesive is supposed to be applied.

With a second sensor S2, the surface contour/surface roughness can be determined in the area in which the adhesive is supposed to be applied. For example, the surface of the workpiece is sampled with a laser beam and the roughness is determined from the reflected components. Consequently, it can be determined whether it is a particleboard having relatively large pores or a solid wood board having a relatively smooth surface.

The first sensor S1 and the second sensor S2 are connected by a line 11 to a control device 10 of the coating device. The control device 10 can be a centralized or decentralized control device. By means of the control device 10, the values detected by the sensors S1, S2 are recorded and evaluated as described below.

The control device 10 is further connected by a second line 12 to a dosage device 15 and an applicator element 16 (in particular glue roller).

In the embodiment example, in the traveling direction D before the applicator element 16, a temperature regulating device 21 is provided as an example of a manipulation device for manipulating a surface to be coated. With the temperature regulating device 21, the surface of the workpiece W can be pre-heated, for example, if it was detected with the first sensor S1 that the workpiece surface has a temperature which is too low. The workpiece surface can also be cooled if a temperature which is too high is detected. The temperature regulating device 21 is connected to the control device by means of the line 24.

In the traveling direction D after the applicator element 16, a testing device 20 is provided which is connected by the line 23 with the control device 10. Presently, the testing device is formed as a temperature sensor in order to test the temperature of the applied adhesive.

Using the data of the sensors S1, S2 evaluated by the control device 10, the position of the dosing device 15 which can be rotated around an axis, is configured in order to control the amount of the adhesive which is supposed to be applied with the applicator element 16 to the narrow side of the workpiece W.

For example, if it is a chipboard having relatively large pores on the surface to be coated, a larger amount of adhesive will be required than with a relatively smooth surface of a piece of solid wood. When selecting the amount of adhesive, a balance must be struck between optimum adhesion and the thinnest possible adhesive joint.

Consequently, for example, for a relatively rough workpiece surface which was detected by the sensor S2, the amount of the adhesive to be applied can be increased since the adhesive also penetrates into the pores of the workpiece. By contrast, if it is a smooth workpiece surface, the amount of adhesive is to be reduced in order to prevent an adhesive layer which is too thick from being formed on the workpiece.

Moreover, the control device 10 is connected with a heating element (not shown) of an adhesive container (not shown) and/or a heating cartridge in the applicator element 16, in order to adjust the temperature of the adhesive at the applicator element 16.

In the embodiment example according to FIG. 1, it is also possible to heat the adhesive in an adhesive container and/or at the applicator element 16, the temperature regulating device 21 is provided in order to optionally change the temperature of the workpiece surface and consequently to control the temperature of the applied adhesive.

If a relatively high workpiece temperature is detected by the first sensor S1, the temperature of the adhesive H can thus be reduced and/or the surface of the workpiece W can be cooled by the temperature regulating device 21. A relatively high temperature at the narrow side of the workpiece W can, for example, be present if the ambient temperature is already relatively high or a machining step in the area of the surface of the workpiece to be coated is carried out immediately before the application the adhesive.

Since the workpiece W was then provided with an adhesive layer which is optimally adapted to the workpiece W, the workpiece is moved further in the direction of a pressing element 18. The testing device 20 checks the applied adhesive, in particular its temperature and/or the thickness of the adhesive film.

The pressing element 18 is used to press a coating material B which was trimmed in the length of the surface to be coated and will be trimmed on the narrow side of the workpiece provided with the adhesive.

After application of the coating material, post-processing steps can be carried out.

Figure 2:
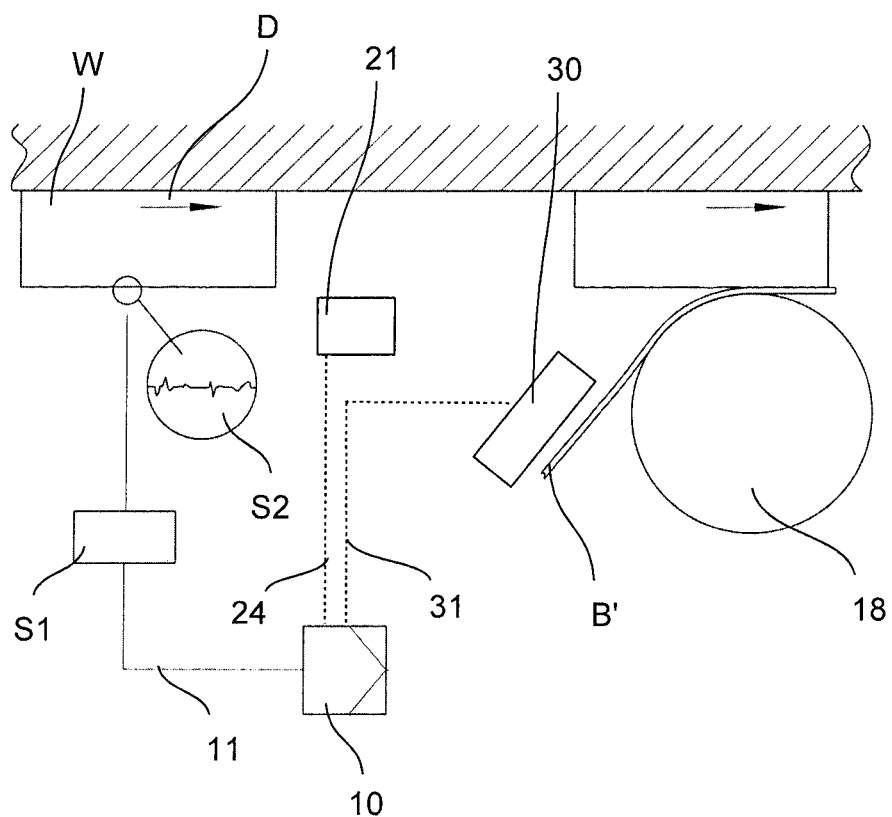
FIG. 2 shows a second embodiment of the invention.

In the following, a second embodiment of the invention is described on the basis of the schematic illustration in FIG. 2. Identical or similar components are provided with corresponding reference numbers. Reference is made to the statements regarding the first embodiment for a detailed description of these components.

The coating device according to the second embodiment comprises, as with the first embodiment, a first sensor S1 and a second sensor S2 which are connected by a line 11 to a control device 10. Furthermore, a manipulation device 21 is provided which is connected by a line 24 to the control device 10.

The second embodiment differs from the first embodiment in that instead of an adhesive application on the workpiece, an activation of an adhesive provided on a coating material B' is carried out. The coating material B' can be a co-extruded coating material or a support material provided with an adhesive layer.

Consequently, according to the second embodiment, an activation device 30 is provided which is connected with the control device 10 by means of a line 30. The activation device 30 is configured to activate the adhesive or the adhesion promoting layer of the coating material B', in particular to heat it.

If a raised surface temperature on the workpiece is detected by means of the first sensor S1, the control device 10 can thus determine that the activation device 30 is to be operated with reduced power so that the adhesive or the adhesion promoting layer of the coating material B' is activated to a reduced extent.

If it is detected by means of the second sensor S2 that the surface to be coated has an increased surface roughness, the control device 10 can thus determine that the activation device 30 is to be operated with increased power. Consequently, the adhesive or the adhesion promoting layer of the coating material B' is activated to an increased degree. Consequently, the flowability of the adhesive is kept at a higher degree and the adhesive correspondingly penetrates more into the pores of the workpiece surface.

With regard to the mode of function of the manipulation device 21, reference is made to the statements about the first embodiment. The manipulation device 21 can additionally be used to prepare the surface to be coated, in particular to heat it or to cool it.

Although lines are described in the embodiment examples in order to connect the sensors S1, S2, the manipulation device 21, the testing device 20 or an activation device 30 with the control device, the data transmission can also occur wirelessly.

The invention claimed is:

1. A coating device for coating a workpiece with a coating material, comprising:
    a pressing element for applying a coating material to a surface of a workpiece to be coated,
    an apparatus for effecting a relative movement between the workpiece and the pressing element;
    a detection device for detecting a surface property on the surface of the workpiece to be coated and a device for acting on an adhesive to be used based on the detection result of the detection device; and
    an applicator element for applying the adhesive to the surface of the workpiece to be coated; and
    a dosing device for changing the adhesive amount to be applied by the applicator element to the workpiece,
    wherein the coating device is configured to change the adhesive temperature in an area of the applicator element based on the detection result of the detection device, and
    wherein the dosing device is configured, on the basis of the detection result of the detection device, to change the adhesive amount.

2. The coating device according to claim 1, further comprising a control device which is configured to receive and process the detection result of the detection device and to actuate the device to act on the adhesive to used.

3. The coating device according to claim 1, wherein the detection device is arranged such that the detection device detects the surface property immediately before the application of the application of the adhesive or the attachment of the coating material provided with the adhesive.

4. The coating device according to claim 1, wherein the applicator element has a heating element.

5. The coating device according to claim 1, further comprising a testing device for testing the adhesive applied by the applicator element.

6. The coating device according to claim 1, further comprising an activation device which is configured to activate the adhesive of the coating material provided with the adhesive based on the detection result of the detection device.

7. The coating device according to claim 1, further comprising a manipulation device for manipulating the surface to be coated.

8. The coating device according to claim 1, wherein the detection device comprises a sensor for detecting the surface roughness, and/or the detection device comprises a sensor for detecting the surface temperature.

9. The coating device according to claim 1, wherein the apparatus for effecting a relative movement between workpiece and the pressing element is a belt conveyor, a chain conveyor, or a band conveyor.

10. A method for coating a workpiece, comprising the steps:
    effecting a relative movement between a workpiece and a pressing element to apply a coating material to a surface of the workpiece to be coated;
    detecting a surface property on the surface of the workpiece to be coated;
    acting on an adhesive to adhere the coating material to the surface to be coated;
    applying the coating material to the surface of the workpiece to be coated; and
    changing, by a dosing device, the adhesive amount to be applied to the workpiece,
    wherein the adhesive is applied before the application of the coating material to the surface of the workpiece to be coated,
    wherein the adhesive temperature in an area of the applicator element is changed based on a detection result of a detection device,
    and wherein the adhesive amount is changed based on the detection result of the detection device.

11. The method according to claim 10, wherein the surface property is a surface roughness.

12. The method according to claim 10, wherein the surface property is a surface temperature.

13. The coating device according to claim 5, wherein the testing device comprises a temperature sensor.

14. The coating device according to claim 7, wherein the manipulation device is a temperature regulating device.

15. The coating device according to claim 7, wherein the manipulation device is provided in a traveling direction after the detection device and before the pressing element.

16. The coating device according to claim 14, wherein the manipulation device is provided between the detection device and the applicator element for applying the adhesive.

17. The method according to claim 10, wherein a narrow side of a plate-shaped workpiece is coated with the coating material.

18. The method according to claim 14, wherein the amount of the adhesive is changed based on the detection result of the surface roughness.

19. The method according to claim 12, wherein the temperature of the adhesive is changed and/or acted upon by a temperature control device on the surface of the workpiece to be coated based on the detection result of the surface temperature.

* * * * *